FIG. 1

INVENTORS
WAYNE EUGENE MC CABE
JOSEF RUDOLF MESSMER
JAMES FRANCIS GIEBER
BY Claude L. Beaudoin
ATTORNEY Feb. 24, 1970   W. E. McCABE ET AL   3,496,700
PACKAGING APPARATUS
Filed Sept. 13, 1967   5 Sheets-Sheet 2

INVENTORS
WAYNE EUGENE MC CABE
JOSEF RUDOLF MESSMER
JAMES FRANCIS GIEBER

Claude L. Beaudoin
ATTORNEY

Feb. 24, 1970 W. E. McCABE ET AL 3,496,700

PACKAGING APPARATUS

Filed Sept. 13, 1967 5 Sheets-Sheet 4

INVENTORS
WAYNE EUGENE MC CABE
JOSEF RUDOLF MESSMER
JAMES FRANCIS GIEBER

BY Claude L. Beaudoin
ATTORNEY

United States Patent Office 3,496,700
Patented Feb. 24, 1970

3,496,700
PACKAGING APPARATUS
Wayne Eugene McCabe, Brandywood, Del., Josef R. Messmer, Geneva, Switzerland, and James Francis Gieber, Wilmington, Del., assignors to E. I. du Pont de Nemours and Company, Wilmington, Del., a corporation of Delaware
Filed Sept. 13, 1967, Ser. No. 667,417
Int. Cl. B65b 9/06, 51/30, 53/06
U.S. Cl. 53—167         7 Claims

ABSTRACT OF THE DISCLOSURE

An apparatus for packaging articles in heat shrinkable overwraps is presented which comprises in operative association a packaging film supply roll assembly, a packaging film divider plate assembly, a heat-sealing assembly, a conveyor assembly and a heated tunnel.

The invention

The present invention relates to packaging apparatus and, more particularly, is directed to a novel apparatus for packaging comestibles such as freshly cut red meat and poultry that are especially adapted for display in refrigerated self-service display cases.

It is now well known and customary to prepackage many food items such as fresh meats for display in self-service stores and the like. Such packages are well adapted for the short term storage and display of meat products and they ordinarily consist of a coated transparent film material such as cellophane or other organic thermoplastic material wrapped completely around the meat product which rests upon a tray or board usually of absorbent material. The transparent film material is gathered and folded under the tray or board of the package and heat-sealed thereat in order to provide a package of neat appearance while also protecting the wholesomeness of the food item therewithin. One of many problems encountered in the use of the aforementioned package is that such packages are characterized by an undesirable bulk or mass of the film material that is gathered and folded under the usual carrier tray of the package. The undesirable bulk or mass of film material is objectionable for many reasons of which may be mentioned the fact that it renders the film material difficult to heat-seal, resulting oftentimes in improperly sealed packages which easily become unwrapped. Also, the bulk of the film material obscures visibility of the bottom portion of the package even when transparent trays are used and detracts from the appearance of the package since it ordinarily provides a bulge in the package thus oftentimes rendering difficult and even impossible the stacking of many packages in a one-on-top-of-another fashion for storage and also display purposes. The principal disadvantage of the known apparatus resides in the restricted application thereof as to packages of limited size and the inability to properly seal and heat-shrink packages fabricated of polyolefin material. Accordingly, it is the principal object of the present invention to provide a packaging apparatus especially adapted for packaging comestibles.

According to the present invention there is provided an apparatus for packaging articles such as comestibles in an overwrap of thermoplastic polymeric material in film form comprising means for providing a plurality of folded films, means for heat-sealing the edges of said film and enclosing an article to be packaged therewithin, and means for shrinking said heat-sealed film to provide a package characterized by a substantially wrinkle-free top portion extending over said article joined to a substantially wrinkle-free bottom portion extending over the bottom of said article.

The nature and advantages of the invention will be more clearly understood by the following description and the several views illustrated in the accompanying drawings wherein like reference characters refer to the same parts throughout the several views and in which.

The packaging apparatus herein disclosed in illustration of the invention includes a base frame 10 composed of frame members 11, 12 and 13 so constructed and arranged as to present a support frame preferably resting upon a plurality of leg members such as tubular legs 14 for supporting the entire organzation of mechanical members constituting the apparatus of the present invention as will be more fully and particularly described herebelow. Attached to and disposed upon frame member 10 are packaging film support member 15, packaging film divider plates 16, heat-sealing member 17, conveyor member 18 and heated tunnel 19.

Figure 1:
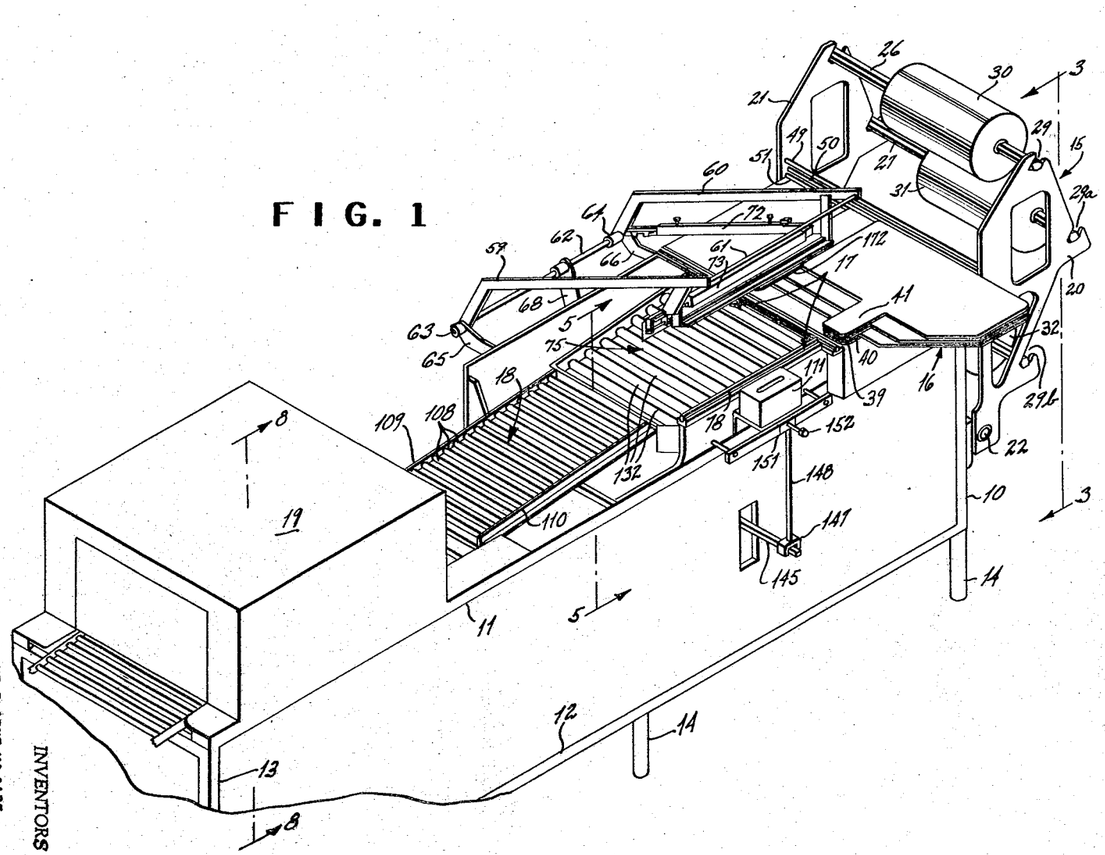
FIGURE 1 is a perspective view of the general arrangement of the apparatus of the present invention.
Figure 2:
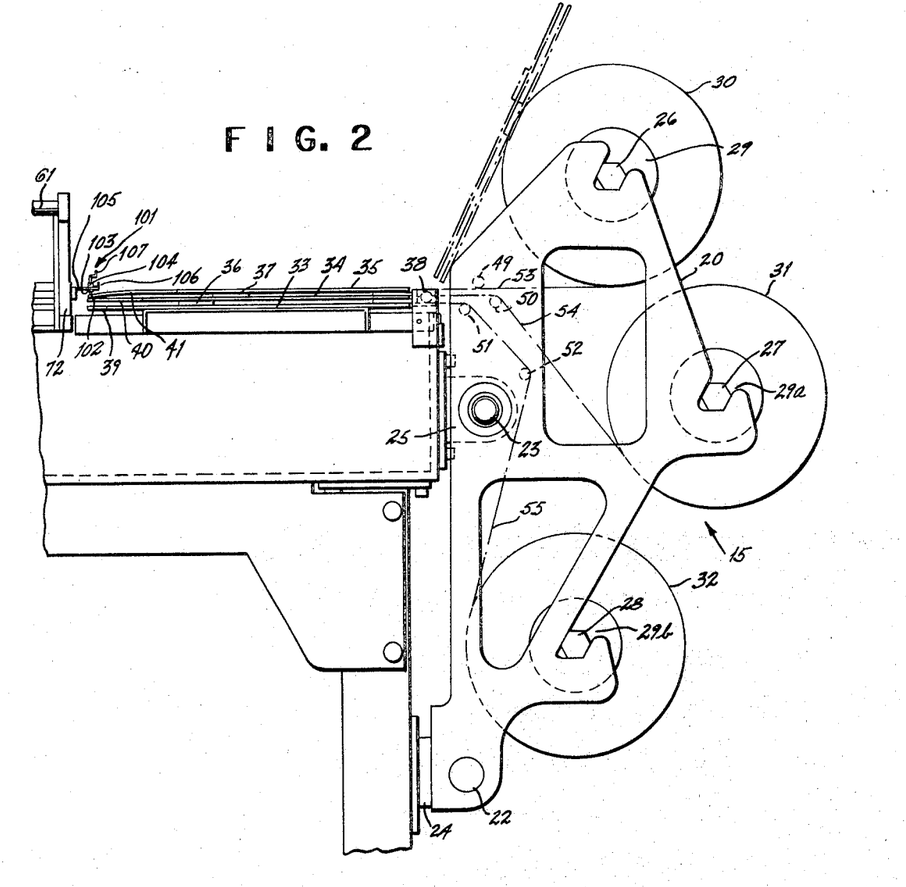
FIGURE 2 is a side elevation view of the wrapping film supply rolls and the wrapping film divider plates utilized in the apparatus of FIGURE 1.

Referring to FIGURES 1 and 2 in particular, the packaging films adapted for use in the apparatus of the invention are supported by packaging film support member 15. The packaging film support member 15 includes end frame members 20 and 21 that are movably supported on base frame 10 by means of shaft members 22 and 23 that slidably engage journal members 24 and 25 secured to base frame 10. Mandrels such as 26, 27 and 28 for supporting rolls of packaging film extend across the entire width of packaging film support member 15. As shown in FIGURE 1, each mandrel 26, 27 and 28 engages slots as at 29, 29a and 29b that are cooperatively disposed in each of end frame members 20 and 21, and the mandrels are thereby held in position for supporting rolls of packaging film such as rolls 30, 31 and 32. The entire organization of the packaging film support member 15 is so constructed and arranged as to be movable transversely of base frame 10 by the sliding action of shaft members 22 and 23 through journal members 24 and 25. Of course, packaging film support member 15 may be moved transversely either manually or by any suitable mechanical means such as, for example, a helical screw drive or a rack and pinion train assembly. The movable feature and function of packaging film support 15 will be discussed in greater detail herebelow after the following discussion regarding the packaging film divider plates 33, 34 and 35.

Figure 3:
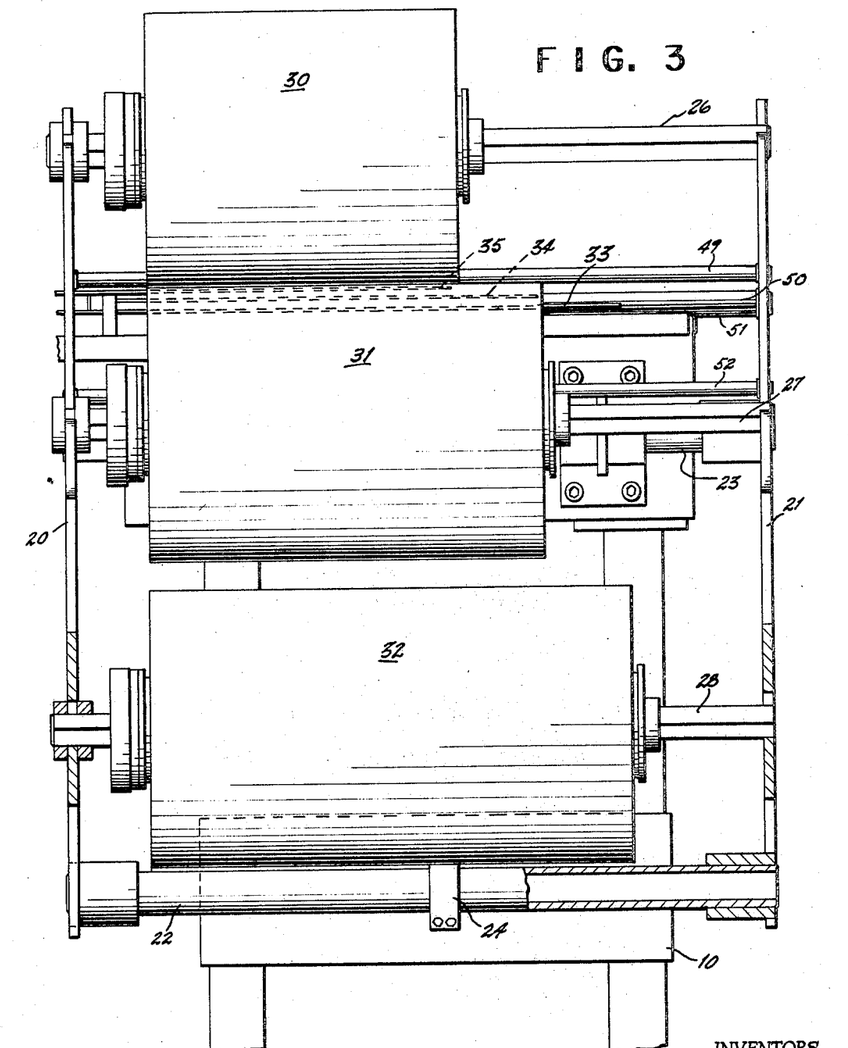
FIGURE 3 is a cross-sectional view taken along line 3—3 in FIGURE 1 showing an end elevation view of the wrapping film supply roll assembly of the apparatus depicted therein.

The packaging film divider plate assembly includes individual divider plates 33, 34 and 35 which are positioned immediately adjacent to and in cooperative relation to the packaging film support member 15. The divider plates 33, 34 and 35 are disposed in a stacked relation to one another and are separated from each other by spacer blocks such as 36 and 37 that are attached by any suitable means to one side of each plate in the manner shown in FIGURE 2. The divider plates are each separately hinged to a common axis 38 and thus are adapted for pivotal movement in a clockwise direction about pivot axis in 38 to a raised position as in the manner shown in dotted outline in FIGURE 2. The packaging film divider plates may be of any suitable material such as, for example, stainless steel. Each separate film divider plate is preferably dimensioned differently both width-wise and length-wise; that is, divider plate 33 is preferably wider and longer than divider plate 34 which is, in turn, wider and longer than divider plate 35, all in the manner as is generally shown in FIGURES 1, 2 and 3 and for reasons more fully explained herebelow.

Figure 4:
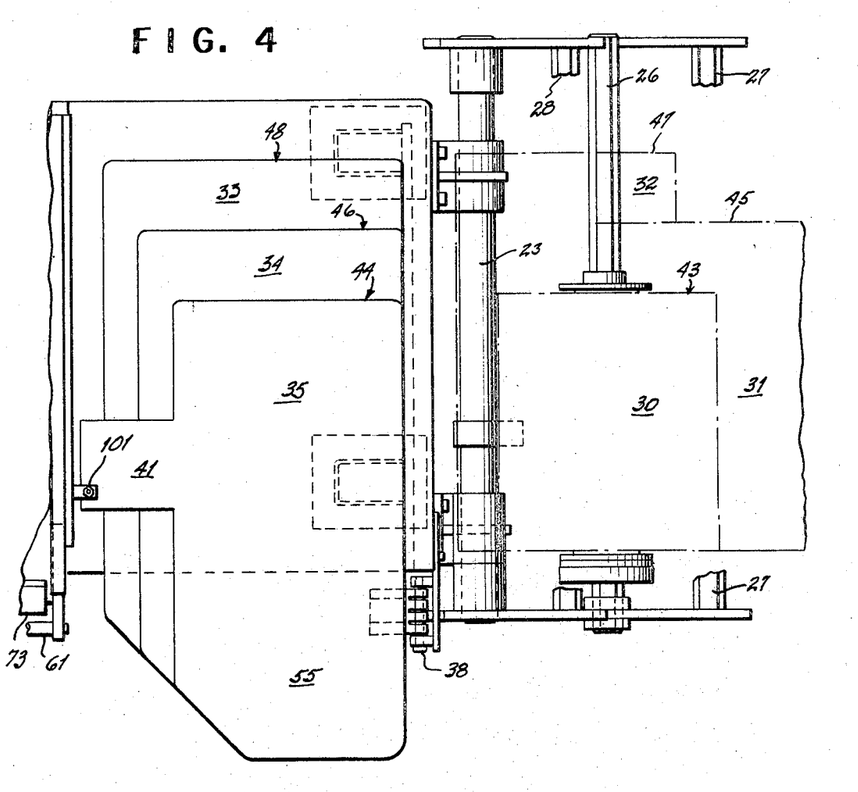
FIGURE 4 is a top plan view of the wrapping film supply rolls and the wrapping film divider plates of FIGURE 2.

A unique feature of the apparatus of the present invention is the cooperative association between the packaging film support member 15 and the packaging film divider plates 33, 34 and 35. These elements of the apparatus function together in a manner as to permit the use of differently sized packaging film in a single apparatus for packaging articles of greatly different size. Specifically, the rolls of packaging film 30, 31 and 32 adapted to be supported in packaging film support member 15 may be each of different width as is shown in FIGURE 3, but each contains a folded wrapping film or web such as a center-folded film. The rolls 30, 31 and 32 of preferably center-folded wrapping film are adapted to be positioned and arranged on their respective mandrels in support member 15 as to present the folded edge of each wrapping film substantially in alignment with the ends of the corresponding divider plates 33, 34 and 35. For instance, as may be seen in FIGURE 4, the folded edge 43 of roll 30 is substantially in alignment with end 44 of film divider plate 35; folded edge 45 of roll 31 is substantially in alignment with end or edge 46 of film divider plate 34; and folded edge 47 of roll 32 is substantially in alignment with end or edge 48 of film divider plate 33. The folded wrapping films or webs of packaging film rolls 30, 31 and 32 are adapted to be unrolled from their respective rolls and threaded over associated guide bars or rollers such as 49, 50, 51 and 52 and then led to their respective film divider plate. FIGURE 2 depicts the foregoing by showing folded wrapping film 53 from packaging roll 30 passing under guide roll 49 and continuing to film divider plate 35. In like manner, FIGURE 2 also shows folded wrapping film 54 from packaging roll 31 passing over guide roll 50 and then continuing to wrapping film divider plate 34, and folded wrapping film 55 from packaging roll 32 passing over guide rolls 51 and 52 and continuing to wrapping film divider plate 33. The divider plates function to separate the top and bottom layers of the folded wrapping film whereby the top layer of the folded wrapping film passes over the upper surface of the divider plate and the bottom layer of the folded wrapping film passes beneath the divider plate. The article to be packaged may be introduced between the top layer and the bottom layer of the folded wrapping film by merely placing the article, which is usually supported on a tray, on the foreportion of the divider plate as at 55 (FIGURE 4) and slipping the article between the top layer of the folded wrapping film and the upper surface of the divider plate. The folded wrapping film and corresponding divider plate is selected according to the size of the article to be packaged. For instance, center-folded wrapping film 53 and corresponding film divider plate 35 are employed as in the position thereof indicated in FIGURE 1 when small articles are to be packaged. On the other hand, center-folded wrapping film 55 and corresponding film divider plate 33 are employed when larger size articles are to be packaged, in which case film divider plates 34 and 35 are pivoted out of the way to a raised position as shown in dotted outline in FIGURE 2. The adjustable feature of film support member 15 whereby it is movable transversely in the manner above described enables accurate and proper positioning of the folded wrapping films being used to accommodate variations in the widths of the articles being packaged. The specific manner of placing an article to be wrapped within the folded wrapping film and moving the partially enclosed article to the heat-sealing station or element of the apparatus during a typical continuous sealing and wrapping operation will be described hereinbelow.

Figures 5, 6:
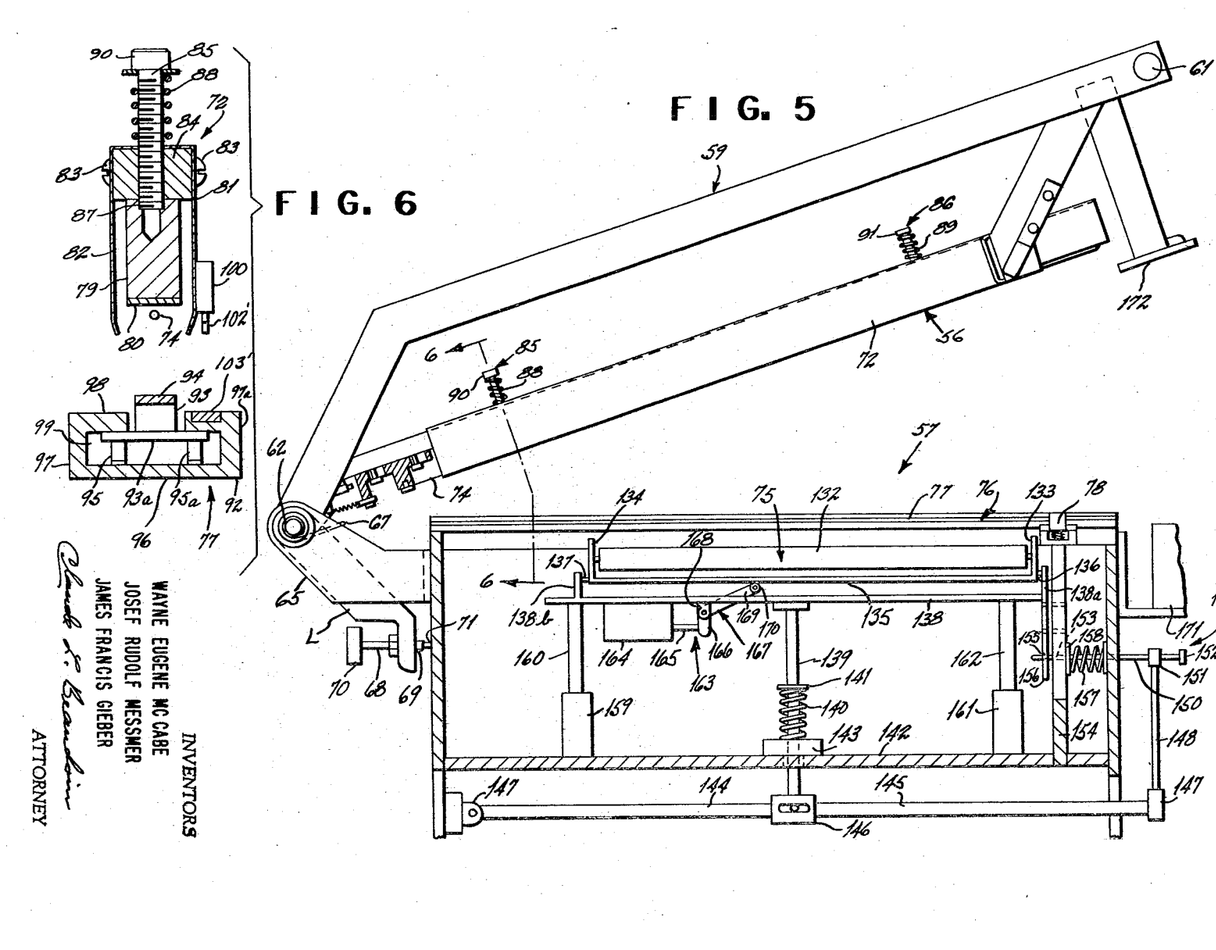
FIGURE 5 is an elevation view in cross-section taken along line 5—5 in FIGURE 1 showing in greater detail the construction of the heat-sealing and severing mechanism of the apparatus depicted therein.
FIGURE 6 is an elevation view in cross-section of the heat-sealing and severing mechanism taken along line 6—6 in FIGURE 5.

The heat-sealing member 17 of the apparatus of the present invention is supported on base frame member 10 immediately adjacent the packaging film divider plates 33, 34 and 35. The heat-sealing member 17 includes an upper assembly 56 and a lower assembly 57 (FIGURE 5) adapted for cooperative engagement whereby to heat-seal together two superposed films of heat-sealable thermoplastic material interposed therebetween. The heat-sealing member 17 is shown in greater detail in FIGURE 5 which depicts a cross-sectional elevation view of only the heat-sealing member taken along the lines 5—5 in FIGURE 1. As shown in FIGURES 1 and 5, the upper assembly 56 includes a supporting frame element consisting of spaced members 59 and 60 disposed in the same reference plane and each interconnected at one end by means of member 61 to provide a unitary construction. The frame members 59 and 60 are each connected at their other end to a member 62 which may conveniently be rod-shaped with each end thereof 63 and 64 rotatably mounted to one of the respective extension lugs or ears 65 and 66 that project from and are secured to lower assembly 57. Any suitable means such as a torsion spring element 67 may be operatively secured to lugs 65 and 66 and member 62 for maintaining the upper assembly 56 of the heat-sealing element in a normally open or "up" position as shown in both FIGURES 1 and 5. The extent of the normally open position of the upper assembly 56 is adjustable by means of lever L which is secured at one end to connecting member 62 and provided at its other end with adjustable screw 68 disposed in threaded aperture 69. The adjustable screw 68 is provided with a knob 70 at one end and contacts the wall of lower assembly 57 at 71.

The supporting frame of the upper assembly 56 is adapted to support film sealing and severing bars 72 and 73 that are secured thereto and arranged thereon at right angles to each other to present an L-shaped array. As shown in FIGURE 6, the heat-sealing and severing bars include a heat-sealing and severing element 74 of wire-form that is electrically impulse heated as will be more fully discussed below.

The lower assembly 57 of the heat-sealing member 17 includes a vertically adjustable platform 75 and heat-sealing and severing base mechanism 76 consisting of base elements 77 and 78 that are disposed at right angles to each other to present an L-shaped array.

The L-shaped array of heat-sealing and severing bars 72 and 73 and the L-shaped array of base elements 77 and 78 are constructed and arranged in cooperative association as to both heat-seal and sever two superposed films of heat-sealable thermoplastic material. The cooperative disposition of the heat-sealing bars and base elements is shown in greater detail in FIGURE 6 which depicts a cross-sectional view of heat-sealing bar 72 and base element 77 taken along line 6—6 in FIGURE 5. The heat-sealing and severing bar 72 includes a sealing head 79 having the heat-sealing and severing element 74 extending continuously along the entire length of end-face 80 thereof. The sealing head is provided with means 81 and 82 preferably of thin flexible metal that extend substantially the entire length of sealing head 79 along each side thereof. As shown in FIGURE 6, the means 81 and 82 are thin flexible metal strips that extend below the sealing head 79, and even below the heat-sealing and severing element 74, to a common horizontal plane. The thin flexible metal strips 81 and 82 are each secured by any suitable means such as screws 83 to a common member 84 which is supported by sealing head 79 for vertical movement in relation thereto. Member 84 is maintained in position on sealing head 79 by means of threaded bolts 85 and 86 that extend through member 84 and are secured in threaded aperture 87 in the sealing head. Suitable springs 88 and 89 are placed between the head portions 90 and 91 of threaded bolts 85 and 86 and member 84 which urge member 84 into firm contact against the sealing head 79 for reasons that will be described herebelow.

The base element 77 includes a slotted or hollow base member 92 having a bottom wall 96, side walls 97 and 97a and slotted top wall 98 providing a hollow interior space or channel 99. The base member 92 is adapted to accommodate within channel 99 therein a "floating" base mechanism consisting of rectangular bar 93 and leaf spring means 95 and 95a. The bar 93 is urged upwardly, as viewed in FIGURE 6, by means of spring members 95 and 95a that contact the bottom of channel 99 in base member 92 at one end and contact plate 93a secured to bar 93 at the other end thereof. The upper limit of travel of "floating" bar 93 is provided by plate 93a secured to the bottom thereof and adapted to contact the underside of top wall 98 of slotted base member 92, in the manner depicted in FIGURE 6. Either or both of "floating" bar 93 and sealing head 79 preferably have the surfaces thereof that face each other covered with suitable resilient means such as 1/16" thick VITON® brand of elastomeric material as indicated at 94 in FIGURE 6.

The cooperative relation and associated of heat-sealing bars 72 and 73 and base elements 77 and 78 provide a measure of heat-sealability and satisfactory operation that is truly outstanding. In operation, the layers of superposed wrapping film to be heat-sealed and severed are introduced between the sealing bars and base elements. The superposed layers of wrapping film are draped over the raised floating bar 93 whereby to provide a greater amount of the wrapping film material than otherwise would be provided over a flat surface. Thereafter, the upper assembly 72 including sealing head 79 is lowered to contact the superposed layers of wrapping film. As the sealing head 79 is lowered, the thin flexible metallic strips 81 and 82 contact the superposed layers of wrapping film before these are contacted by the heat-sealing and severing element 74. This sequence of operation is very important and forms a unique feature of the apparatus of the present invention. Specifically, the thin flexible metallic strips 81 and 82 are first to contact the superposed layers of wrapping film and urge the wrapping film against the top wall 98 of the base element thereby to function as tension isolators which both hold the superposed layers of wrapping film firmly against the top wall 98 of the base element to restrict the tension forces in the superposed layers of wrapping film substantially to the portion or area theerof bounded by or within the metallic strips 81 and 82 and preclude premature contact of the superposed layers of wrapping film by the heat-sealing and severing wire-element 74. Furthermore, when the sealing head 79 is lowered so as to contact the superposed layers of wrapping film, the "floating" bar 93 simultaneously yields thereby to provide an excess amount of wrapping film along substantially the entire seal path of heat-sealing wire-element 74 which results in stronger seals. That is, when the superposed layers of wrapping film are of a heat-shrinkable thermoplastic material, some of the excess film shrinks towards the heat-sealing and severing element 74 and provides resin reinforcement at the sealed edges of the package resulting in a stronger package. The resilient or "floating" feature of the base elements 77 and 78 provides a means for achieving uniform heat-sealing and severing pressure to be distributed along the severance line. Furthermore, the relatively high coefficient of friction of the surface of the covering 94 on the floating bar 93 as compared with the coefficient of friction of the wrapping film material substantially prevents relative movement therebetween during the heat-sealing and severing operation.

The maintenance of a substantially uniform contact pressure and clamping time during the heat-sealing and severing operation is achieved by use of an electromagnet clamping device 171 and its associated metal plate 172 shown in FIGURES 1 and 5. The clamping capacity of magnet device 171 provides a more uniform and greater pressure between the sealing and severing element 74 and the sealing base than is attainable by manual operation. The overall result is the attainment of more uniform and better heat-seals. The electromagnetic clamping device 171 also provides for increased apparatus productivity by affording the operator thereof greater flexibility during the packaging operation.

A unique feature of the heat-sealing member 17 of the apparatus of the present invention is the provision of adjustable platform 75 shown in FIGURES 1 and 5. The platform 75 is so constructed and arranged as to accommodate the packaging of items of different heights and to pivot about the end thereof which is adjacent to conveyor 18 to discharge the package onto conveyor member 18 in response to suitable actuation by means for tilting platform 75 upon completion of the package sealing operation.

Referring to FIGURE 5, the platform 75 comprises a plurality of rotatably mounted roller members 132 which are rotatably journaled at each end in supports 133 and 134 that are connected to a platform structure 135. The platform structure 135 is pivotably connected at one end adjacent conveyor 18 by means of pivot pins 136 and 137 which are each connected at one end to supports 133 and 134, respectively, and rotatably secured at each other end in lugs 138a and 138b, respectively, secured to supporting plate 138. The supporting plate 138 is centrally mounted on shaft 139 which is spring-loaded by spring 140 to offset the weight of the adjustable platform assembly. Spring element 140 encircles shaft 139 and one end thereof abuts against circular flange 141 connected to shaft 139 and the other end of spring 140 abuts against a fixed bedplate 142 or a block 143 resting thereon. Shaft 139 is operatively connected to levers 144 and 145 by means of linkage 146 in a manner for adjusting supporting plate 139 vertically. Lever 144 is pivotably connected at one end as at 147 to the rear wall of lower assembly 57 while the other end thereof is pivotably connected to slotted linkage 146. Lever 145 is pivotably connected at one end to slotted linkage 146 while the other end thereof is pivotably connected to linkage 147. An adjusting bar 148 is connected at one end to linkage 147. The other end of adjusting bar 148 is provided with a retractable adjusting pin assembly 149 having a spring-loaded pin 150 adapted for movement through an aperture in block 151 connected to the end of adjusting bar 148. The pin 150 has a knob 152 at one end and is adapted to extend through a suitable opening in the front wall of lower assembly 57 and through one of several apertures 153 in indexing plate 154 and through any one of a plurality of apertures such as 155 disposed vertically of one another in vertical adjusting plate 156 that is connected to and depends from supporting plate 138 of adjustable platform 75. Spring element 157 encircles pin 150 intermediate indexing plate 154 and the front wall of lower assembly 57, and one end of spring element 157 abuts against circular flange 158 connected to pin 150 for urging pin 150 into the selected aperture in vertical adjusting plate 156. In operation, the platform 75 is adjusted vertically by grasping knob 152 and retracting pin 150 and urging adjusting bar 148 either upwardly or downwardly as desired to bring pin 150 into alignment with any one of the vertically disposed apertures in indexing plate 154 and releasing pin 150 so that it may be urged through the corresponding aperture in vertical adjusting plate 156 thereby to maintain platform 75 at the desired level. Rod and bushing assemblies such as 159, 160 and 161, 162 are provided to maintain vertical alignment of the adjustable platform assembly when a height adjustment is made. The rods such as 160 and 162 are adapted to slide vertically in cylindrical bushings 159 and 161 thereby maintaining the platform structure in alignment.

As previously stated the supporting structure 135 is pivoted about the end which is adjacent to conveyor member 18. The end of the supporting structure 135 which is adjacent to the transverse heat-sealing and severing bar 72 is raised upon completion of the package seals by the solenoid-operated assembly 163 consisting of solenoid 164 and plunger 165 operatively connected thereto. The solenoid plunger 165 is connected at one end to the short leg 166 of L-shaped lever 167 which is pivotably connected at its fulcrum 168 attached to a lug 168 attached to supporting plate 138. One end of long leg 169 of L-shaped lever 167 is provided with a cam follower 170 which contacts the underside of platform structure 135. In operation, plunger 165 is urged against the short leg of L-shaped lever 167 whereby L-shaped lever 167 pivots about its fulcrum to urge cam follower 170 against platform structure 135 to raise the latter which pivots about pivot pins 136 and 137. The operation of the plunger 165 is sequentially timed with the heat-sealing and severing operation such that a package is automatically raised by the above-described mechanism after being formed and passes by gravity down the adjustable platform 75 and to conveyor member 18.

It is readily evident from the foregoing description that the heat-sealing and severing operation must be performed at least once transversely of any of the folded wrapping films in order to provide a transverse seal on the leading edge thereof. This may conveniently be done by unwinding the preferably center-folded wrapping films individually from the rolls thereof and threading them through or by the guide bars and past the wrapping film divider plates and to the heat-sealing and severing mechanism in the manner as above described. The leading or most forward edge of the center-folded wrapping film is then sealed in the manner as above explained and the scrap of wrapping film obtained during this sequence of the operation may be discarded. The apparatus is then in a state of readiness for continuous operation and articles to be wrapped are merely introduced between the top layer of the center-folded wrapping film and the desired wrapping film divider plate, as above explained, and the article is moved to the extreme left position that is, up against the heat-sealed leading edge of the center-folded wrapping film. The enveloped and partially sealed article is next moved to the heat-sealing and severing member 17 of the apparatus and is positioned on the adjustable platform 75 which may be adjusted or positioned to accommodate the height of the package so that the heat-seal path as between the upper layer and the lower layer of the center-folded wrapping film circumscribes the package at its mid-height.

Another unique feature of the cooperative association of the wrapping film divider plates 16 and the heat-sealing unit 17 resides in the organization and construction of the integral tab portions 39, 40 and 41 that extend from the main body portion of the respective wrapping film divider plates. The integral tab portions 39, 40 and 41 provide similar means on each wrapping film divider plate adapted to cooperatively engage the heat-sealing element of the apparatus. The foregoing is shown in FIGURE 2 wherein 101 is an electrically heated pin unit, called a glow pin, that is attached to heat-sealing and severing bar 72. The glow pin unit 101 includes a cylindrical pin 102 that is held by suitable electrically insulated nuts 103 and 104 to support member 105 which is, in turn, secured at one end to heat-sealing and severing bar 72. The glow pin unit is connected to a suitable source (not shown) of electric heating current by means of connectors 106 and 107. The purpose of the glow pin unit 101 is to burn a vent hole or opening in the top layer of the center-folded wrapping film. As shown in FIGURE 2, the vent opening is formed during the heat-sealing operation by lowering the upper assembly 56 of the heat-sealing member 17 and pressing glow pin unit 101 against the top layer of the center-folded wrapping film that extends over the integral tab portion of the film divider plate. FIGURE 2 illustrates the glow pin unit disposed in operative relation to integral tab 41 of wrapping film divider plate 35. The glow pin unit 101 forms the vent opening in the top layer of the center-folded wrapping film by melting the polymeric material. The melted polymeric material forms a grommet or thicker portion of polymeric material around the edge of the vent opening and thus provides a region of reinforcement of great resistance to enlargement or tearing.

An alternate and preferred means of providing vent openings in the overwrap of the package being formed is shown in FIGURE 6. As shown in cross-sectional view in FIGURE 6, the unit 100 for forming the vent openings comprises a housing of electrically non-conductive material attached to tension isolator strip 81 and an electrically heated piercing element 102'. The piercing element 102' is preferably formed from a bent 0.032" diameter Nichrome wire connected at its ends to a suitable source of electric heating current. The piercing element 102' is preferably impulse heated by use of the same circuit network employed to heat the heat-sealing and severing elements such as 74 when the sealing member 17 is in its closed position.

When the sealing member 17 is in its closed position the piercing element 102' melts a hole through the two layers of superposed wrapping film and then contacts the electrically insulated portion 103' of synthetic rubber material in top wall 98 of base element 92 thereby to provide a vent hole opening in both the upper and lower layers of superposed wrapping film while the package is being formed. The unit 100 for forming vent hole openings in the wrapping film may be removed from the sealing member 17 when packages are being fabricated that do not require to be vented.

Figure 7:
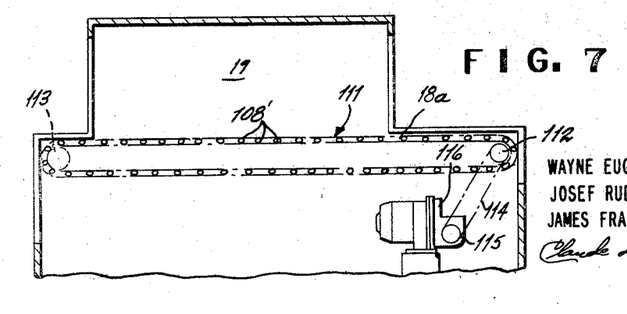
FIGURE 7 is a side elevation view in cross-section of the heat-shrink tunnel and conveyor assembly of the apparatus depicted in FIGURE 1.

The conveyor member 18 of the apparatus of the present invention is supported on frame 10 immediately adjacent the heat-sealing member 17. The conveyor member 18 includes a plurality of roller elements 108 suitably rotatably journaled in supports 109 and 110. The roller member supports may be driven by any suitable arrangement as by a chain and sprocket assembly coupled to a prime motive source such as an electric motor. The important consideration is that the conveyor member 18 function to transport packages of articles from the heat-sealing member 17 to the heated tunnel 19. Indeed, the conveyor member and the heated tunnel may be and preferably are combined into a single unit as represented schematically in FIGURE 7 which depicts a longitudinal cross-sectional elevation view of the heated tunnel 19. As shown in FIGURE 7, the conveyor member 18a includes an endless belt or chain 111 of roller elements 108' adapted to rotate around sprockets 112 and 113. The endless chain 111 of roller elements is driven by belt or chain 114 which derives its motive power from sprocket 115 operatively connected to the output shaft of motor-reducer 116.

Figure 8:
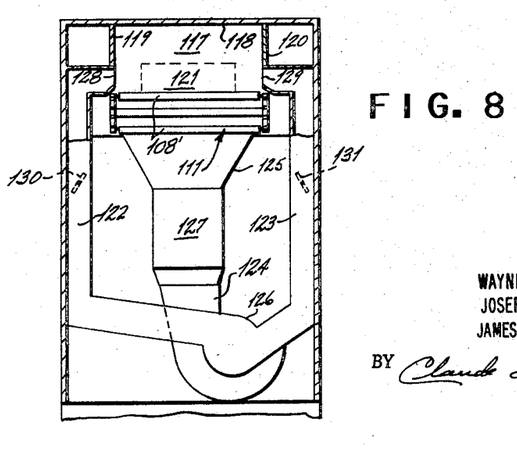
FIGURE 8 is an end elevation view in cross-section of the heat-shrink tunnel taken along line 8—8 in FIGURE 1.

The heated tunnel 19 shown schematically in FIGURE 7 and in perspective in FIGURE 1 is more clearly shown schematically in FIGURE 8. As shown in FIGURE 8, which represents a transverse cross-sectional elevation view along line 8—8 in FIGURE 1, the heated tunnel comprises enclosure 117 bounded by walls 118, 119 and 120 and endless chain 111. A package traveling through the heated tunnel is shown by the object 121 depicted by dashed-lines as resting on endless chain 111. The heated tunnel further includes air circulating ducts 122, 123, 124 and 125, air circulating fan 126 and air heater 127. The air circulating fan 126 drives air through air circulating duct 124 to air heater device 127 which is an electrical heater of preferably 6300 watts capacity and adapted to heat the circulating air entering thereinto at a temperature of about 60° F. to a temperature of about 270° F. The heated air travels from heater device 127 into air circulating duct 125 which directs the heated air against only the bottom layer of the center-folded wrapping film which encloses object 121. The air within enclosure 117 is adapted to be recirculated continuously following a flow path through inlets 128 and 129 connected to air circulating ducts 122 and 123, respectively, and through each respective duct to air circulating fan 126. Damper devices 130 and 131 are located within the air circulating ducts for adjusting the flow of air circulated therethrough.

In operation, the loosely wrapped article enclosed by a top layer joined by heat-sealing to the bottom layer of the center-folded wrapping film above-described is forwarded from the heat-sealing member 17 to the heated tunnel 19 via conveyor member 18 or 18a. Within the heated tunnel 19 a stream or blast of a heated gaseous medium such as air is directed against only the bottom layer of the center-folded wrapping film. The hot gaseous medium shrinks the bottom layer of the package uniformly, and a unique feature of the packaging operation utilizing the apparatus of the present invention is that the hot gaseous medium also simultaneously heats the air within the package which expands to balloon the top layer of the center-folded wrapping film away from and out of contact with the article enclosed therewithin. The expanded air within the package is vented through the vent opening in the top layer of the center-folded wrapping film. The resulting packaged article is characterized by a wrapping film tightly drawn over the entire article providing an attractive package of outstandingly good appearance.

What is claimed is:
1. Packaging apparatus comprising
    a frame,
    means secured to said frame adapted to support a plurality of rolls of folded heat-shrinkable packaging film,
    separating means secured to said frame adjacent said first mentioned means for separating said folded packaging film into superposed layers thereof whereby an article to be packaged therewithin may be inserted between said separating means and the uppermost layer of said folded packaging film,
        said separating means comprising a plurality of substantially rectangular plates separated from and disposed in superposed relation to each other and each hinged along one edge to a common pivot pin and adapted to separate a folded packaging film from one roll thereof whereby the top layer of said film overlies the separating plate and the bottom layer of said film is beneath said plate and each of said plates and its associated folded packaging film may be pivoted about the common pivot pin to expose the plate immediately therebeneath,
    heat-sealing means disposed on said frame adjacent said packaging film separating means adapted for sealing said superposed layers of packaging film together to enwrap said article therewithin, and
    a heated enclosure including conveying means secured to said frame adjacent said heat-sealing means for conveying said wrapped article from said heat-sealing means and through said heated enclosure whereby to heat said packaging film and shrink said packaging film to provide a package having a substantially wrinkle-free top portion extending over said article joined to a substantially wrinkle-free bottom portion extending over the bottom of said article.

2. The apparatus of claim 1 wherein said heat-sealing means comprises an L-shaped heat-sealing bar having an upper frame assembly pivotably connected to a lower frame assembly whereby said upper frame assembly is adapted to be lowered upon said lower frame assembly for sealing and severing superposed layers of packaging film disposed therebetween,
    said upper frame assembly including a stationary L-shaped sealing bar having an impulse heated heat-sealing and severing element secured to the lower surface thereof and flexible means depending from a movable bar resiliently supported on the upper surface of said heat-sealing bar adjacent each side of said heat-sealing and severing element, said flexible means disposed substantially parallel to each other and extending to a common plane below said heat-sealing and severing element,
    said lower frame assembly including a stationary L-shaped base member having a raised bar resiliently supported centrally therein which extends beyond the upper surface of said base member whereby the portions of the upper surface of said base member immediately adjacent said raised bar provide shoulder portions adapted to cooperatively engage said flexible means on said upper frame assembly and firmly secure superposed layers of packaging film therebetween upon moving said upper assembly towards said lower assembly.

3. The apparatus of claim 2 wherein electromagnetic means are secured to said lower assembly in cooperative relation to metallic means secured to said upper assembly adapted to contact said electromagnetic means upon moving said upper assembly into firm cooperative engagement with said lower assembly whereby said electromagnetic means maintain said upper assembly firmly engaged with said lower assembly, and
    means secured to said upper assembly adjacent said L-shaped heat-sealing bar for puncturing a vent opening in at least the top layer of said superposed layers of folded packaging film.

4. The apparatus of claim 2 wherein said heat-sealing means includes a movable plate in said lower frame assembly for supporting said enwrapped article, said plate connected to a vertically movable support member and means in operative association therewith for vertically adjusting said plate whereby said superposed layers of packaging film are heat-sealed together to provide a heat-seal line at about the mid-height of said article.

5. The apparatus of claim 4 wherein said movable plate includes a platform member pivotably connected thereto at one end thereof, said platform member having roller means rotatably mounted thereon for supporting said enwrapped article, and means operatively associated therewith for urging the other end of said platform member upwardly to pivot said platform member whereby said enwrapped article is automatically conveyed by gravity on said roller means.

6. Apparatus for separating a plurality of folded packaging films into superposed layers thereof comprising a frame, support means secured to said frame adapted to support a plurality of rolls of folded heat-shrinkable packaging film, separating means secured to said frame adjacent said support means, said separating means including a plurality of substantially rectangular plates separated from and disposed in superposed relation to each other, said plates each hinged along one edge to a common pivot pin each adapted to accommodate a folded packaging film from one roll thereof whereby the top layer thereof overlies said plate and the bottom layer of said folded film is beneath said plate and each of said plates and associated folded packaging film may be pivoted about said pivot pin to expose the plate and folded film immediately therebeneath.

7. Packaging apparatus comprising
a frame,
means movably secured to said frame adapted to support at least three rolls of folded heat-shrinkable packaging film each of different width,
separating means secured to said frame adjacent said first mentioned means for separating said folded packaging film into superposed layers whereby an article to be packaged therewithin may be inserted between said separating means and the uppermost layer of said folded packaging film,
said separating means comprising at least three substantially rectangular plates separated from and disposed in superposed relation to each other and each pivotably connected along one edge to a common pivot pin, said plates each adapted to separate a folded packaging film from one roll thereof whereby the top layer of said film overlies the separating plate and the bottom layer of said film extends beneath said separating plate so constructed and arranged so that each plate and associated folded packaging film is pivotable about said common pivot pin to expose the separating plate and folded wrapping film immediately therebeneath permitting selection of appropriately sized folded wrapping film to package articles of varying size,
heat-sealing means secured to said frame adjacent said packaging film separating means adapted for sealing together and severing said superposed layers of folded packaging film thereby to enwrap said article therewithin, said heat-sealing means having secured thereto electromagnetic clamping means and an electrically heated piercing element each actuated in response to energizing said heat-sealing means, and a heated tunnel enclosure having an inlet and an outlet including conveying means secured to said frame adjacent said heat-sealing means for conveying said wrapped article from said heat-sealing means and through said heated tunnel enclosure, said heated tunnel enclosure having means for directing a heated gaseous medium against only the bottom portion of said enwrapped article thereby to shrink the bottom layer of said packaging film and simultaneously vent air entrapped within said heat-sealed packaging film through a vent opening formed therein by said piercing element to provide a package having a smooth and substantially wrinkle-free top layer extending thereover joined to a heat-shrunken substantially wrinkle-free bottom layer extending over the bottom of said article.

References Cited

UNITED STATES PATENTS

| | | | |
|---|---|---|---|
| 2,485,201 | 10/1949 | Jewett | 211—96 |
| 3,239,993 | 3/1966 | Cherrin | 53—28 X |
| 3,381,449 | 5/1968 | Vaughan | 53—182 X |
| 3,128,584 | 4/1964 | Muskat et al. | 53—180 X |

THERON E. CONDON, Primary Examiner

E. F. DESMOND, Assistant Examiner

U.S. Cl. X.R.

53—182, 184, 390; 242—55.3